Figure 1:
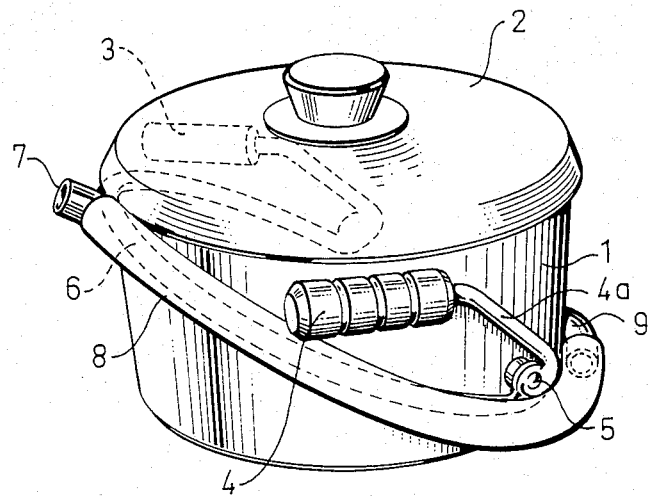

United States Patent [19]

Trolle

[11] Patent Number: 4,506,657
[45] Date of Patent: Mar. 26, 1985

[54] SAUCEPAN, PARTICULARLY FOR USE BY DISABLED PERSONS

[76] Inventor: Sten Trolle, Skansgränd 7, S-271 00 Ystad, Sweden

[21] Appl. No.: 505,034

[22] PCT Filed: Nov. 15, 1982

[86] PCT No.: PCT/SE82/00386
§ 371 Date: Jun. 14, 1983
§ 102(e) Date: Jun. 14, 1983

[87] PCT Pub. No.: WO83/01732
PCT Pub. Date: May 26, 1983

[30] Foreign Application Priority Data

Nov. 13, 1981 [SE] Sweden ............................. 8106766

[51] Int. Cl.³ ............................................. A47J 27/00
[52] U.S. Cl. .................................... 126/373; 126/383; 222/533
[58] Field of Search ........................ 222/530, 533; 126/373–390, 369

[56] References Cited

U.S. PATENT DOCUMENTS

| 283,287 | 8/1883 | Schoening | 222/533 |
| 523,627 | 7/1894 | Ebling | 222/533 |
| 525,924 | 9/1894 | Sabin | 222/469 |
| 731,454 | 6/1903 | Higgins | 222/533 |

FOREIGN PATENT DOCUMENTS

| 8931 | of 1887 | United Kingdom | 222/533 |
| 4301 | of 1896 | United Kingdom | 222/533 |
| 3577 | of 1900 | United Kingdom | 222/530 |

Primary Examiner—Margaret A. Focarino
Attorney, Agent, or Firm—Sughrue, Mion, Zinn, Macpeak and Seas

[57] ABSTRACT

A saucepan for disabled persons which solves the problem of making it possible to drain liquid from the pan (1) without having to tilt it. According to the invention there is provided a conduit (8) the one end of which communicates with the interior of the pan near the bottom thereof and the opposite, free end (7) of which is movable between an upper position substantially level with the upper rim of the pan and a lower position near the bottom of the pan, so that liquid may be drained when the conduit assumes said last-mentioned position.

2 Claims, 2 Drawing Figures

SAUCEPAN, PARTICULARLY FOR USE BY DISABLED PERSONS

The cooking of several food dishes involves heating water in a saucepan, often together with the dish or ingredients thereof.

Smaller saucepans have one single, radially protruding handle. Disabled persons suffering from diseases, especially rheumatism, in their arms, wrists or fingers, are unable to lift such a saucepan by the handle in order to pour out its content. The reason for this is that individuals having such handicaps have great difficulty in making gripping movements. The problem is aggravated by the fact that, as a rule, all of the contents shall not be poured out. Just the other way around, in most cases it is required to hold the saucepan in an inclined position and successively to increase the inclination angle so that the water flows out whereas the solid constituents of the food remains in the saucepan. Such pans of average and bigger size often have two U-shaped handles in a diametrically opposed position. A disabled person finds it easier to handle such a saucepan, because he can grip it between his wrists so that the handles rest against the top thereof. In this way he can lift the saucepan vertically and then move it laterally, e.g. to or from a hot plate of an oven. In contrast thereto he can neither handle such a type of saucepan when liquid removal is required.

The object of the invention is to provide a saucepan which, when containing a liquid, can be emptied also by disabled persons as above explained. The invention is based on the realization that it is possible to design the saucepan so that no tilting movement becomes necessary, the liquid being instead drained through an outlet near the bottom. The characteristics of the invention are set forth in the claims and an embodiment thereof is described below, reference being made to the drawing.

Figure 2:
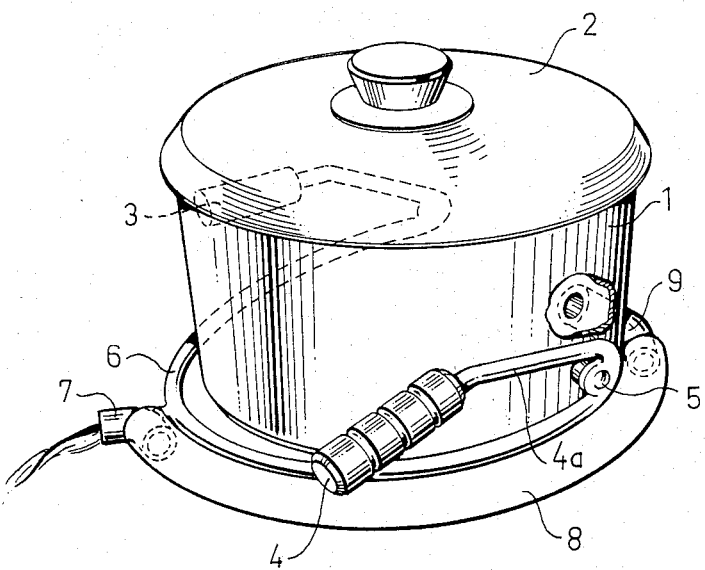

FIG. 1 shows a saucepan according to the invention in its operational position and FIG. 2 shows it in its draining position.

Reference numeral 1 refers to the saucepan vessel which has a lid 2 and two handles 3 and 4 which, in the operational position, are located near the upper rim of the saucepan in the conventional manner. However, the handles are not rigidly connected to saucepan 1 but supported by arms 4a pivotable around pivots 5 located in the bottom region of the pan. According to the embodiment illustrated arms 4a are interconnected by a semiconductor yoke 6 surrounding the vessel. In the midportion of yoke 6 there is a curved outlet nozzle 7 the opening of which is directed radially inwards whereas its opposite end is connected to the one end of a hose 8. The other end of the hose is connected to a socket 9 adjacent the pan bottom. Accordingly, the interior of the pan communicates with hose 8 via socket 9.

When the pan is in its operational position as shown in FIG. 1, yoke 6 is in its upper position meaning that nozzle 7 is approximately level with lid 2. Consequently, liquid inside the pan cannot flow out through nozzle 7.

When the pan is to be emptied as far as its liquid content is concerned, handles 3 and 4 are moved downwards, nozzle 7 and hose 8 participating in the movement of yoke 6 whereby, as shown in FIG. 2, nozzle 7 is brought into a position approximately level with the bottom of the pan. The liquid may accordingly be drained through socket 9, hose 8 and nozzle 7.

In other embodiments of the invention the saucepan has one movable handle only. Instead of a flexible hose connected to a stationary socket it is possible to use a rigid tube which by suitable sealing means is swingably connected to a socket or the like.

In order to make sure that children cannot empty the pan it is possible to provide both handles 3 and 4 with suitable safety means which have to be actuated upon simultaneously in order for a tilting movement to be triggered.

Preferably, there is immediately above the orifice of socket 9 disposed a strainer in the form of a perforated plate or a network which assures that solid parts of small dimensions, e.g. macaroni, are retained above the outlet.

I claim:

1. A saucepan, particularly adapted to be used by disabled persons, comprising:
    (a) a saucepan vessel (1) having a bottom portion and a generally cylindrical sidewall upstanding therefrom,
    (b) a semi-circular yoke (6) surrounding a portion of the vessel, pivotably mounted thereto at spaced points (5) proximate the bottom portion thereof, and having end arms (4a) extending back beyond the pivot points and terminating in handles (3, 4), and
    (c) a drain conduit (8) having an inlet end (9) in communication with the bottom portion of the vessel and an outlet end (7) measured to the yoke intermediate the pivot points, whereby when the saucepan is carried by the handles the outlet end of the conduit is retained in a raised position proximate an upper rim of the sidewall, and when the yoke is pivoted downwardly by depressing the handles the outlet end of the conduit is lowered to a drain position proximate the bottom portion of the vessel.

2. A saucepan according to claim 1, wherein the inlet end of the conduit comprises a socket mounted to the bottom portion of the vessel, the outlet end of the conduit comprises a nozzle mounted to the yoke, and an intermediate portion of the conduit comprises a flexible hose connected between the socket and the nozzle.

* * * * *